US011579906B2

(12) United States Patent
Vichare et al.

(10) Patent No.: US 11,579,906 B2
(45) Date of Patent: Feb. 14, 2023

(54) MANAGING PERFORMANCE OPTIMIZATION OF APPLICATIONS IN AN INFORMATION HANDLING SYSTEM (IHS)

(71) Applicant: Dell Products, L.P., Round Rock, TX (US)

(72) Inventors: Nikhil Manohar Vichare, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 224 days.

(21) Appl. No.: 16/560,209

(22) Filed: Sep. 4, 2019

(65) Prior Publication Data

US 2021/0064401 A1    Mar. 4, 2021

(51) Int. Cl.
*G06F 9/455*  (2018.01)
*G06N 20/00*  (2019.01)

(52) U.S. Cl.
CPC ......... *G06F 9/45525* (2013.01); *G06N 20/00* (2019.01)

(58) Field of Classification Search
CPC .......... G06F 9/45525; G06F 2209/501; G06F 9/5061; G06F 11/30; G06F 9/44505; G06F 1/3231; G06N 20/00; H04W 52/0254
See application file for complete search history.

(56) References Cited

U.S. PATENT DOCUMENTS 5,977,957 A * 11/1999 Miller .................. G06F 1/32 345/174
10,536,352 B1 * 1/2020 Brisebois .......... G06F 16/90335
(Continued)

FOREIGN PATENT DOCUMENTS

CN        106557150 A  *  4/2017
CN        107734617 A  *  2/2018
WO    WO-2016136220 A1 *  9/2016  .............. F24F 13/20

OTHER PUBLICATIONS

Akira et al. WO2016136220A1 Description Translation, Sep. 1, 2016, [retrieved Jun. 11, 2021], [retrieved from Espacenet], <URL:https://worldwide.espacenet.com/publicationDetails/biblio?CC=WO&NR=2016136220A1&KC=A1&FT=D&ND=3&date=20160901&DB=&locale=en_EP>, pp. 1-28 (Year: 2016).*

(Continued)

*Primary Examiner* — Meng Ai T An
*Assistant Examiner* — Hsing Chun Lin
(74) *Attorney, Agent, or Firm* — Fogarty LLP (57) ABSTRACT

Embodiments of systems and methods for managing performance optimization of applications executed by an Information Handling System (IHS) are described. In an illustrative, non-limiting embodiment, a method may include: identifying, by an IHS, a first application; assigning a first score to the first application based upon: (i) a user's presence state, (ii) a foreground or background application state, (iii) a power adaptor state, and (iv) a hardware utilization state, detected during execution of the first application; identifying, by the IHS, a second application; assigning a second score to the second application based upon: (i) another user's presence state, (ii) another foreground or background application state, (iii) another power adaptor state, and (iv) another hardware utilization state, detected during execution of the second application; and prioritizing performance optimization of the first application over the second application in response to the first score being greater than the second score.

16 Claims, 5 Drawing Sheets

(56) References Cited

U.S. PATENT DOCUMENTS

| | | | | |
|---|---|---|---|---|
| 2003/0081011 | A1* | 5/2003 | Sheldon | G06F 1/3231 |
| | | | | 715/838 |
| 2010/0229182 | A1* | 9/2010 | Ito | G06F 9/546 |
| | | | | 719/314 |
| 2013/0275788 | A1* | 10/2013 | Mizuura | G06F 1/3203 |
| | | | | 713/320 |
| 2014/0213323 | A1* | 7/2014 | Holenarsipur | G06F 3/0304 |
| | | | | 455/566 |
| 2016/0150072 | A1* | 5/2016 | Rangarajan | H04W 52/0277 |
| | | | | 455/574 |
| 2017/0075435 | A1* | 3/2017 | Wurster | G06F 3/04166 |
| 2020/0272517 | A1* | 8/2020 | Trigalo | G06F 11/3006 |
| 2020/0334122 | A1* | 10/2020 | Shepard | G06F 11/3089 |

OTHER PUBLICATIONS

Ma et al. CN106557150A Description Translation, Apr. 5, 2017, [database online], [retrieved on May 18, 2022] Retrieved from Espacenet using Internet <URL:https://worldwide.espacenet.com/publicationDetails/description?CC=CN&NR=106557150A&KC=A&FT=D&ND=3&date=20170405&DB=&locale=en_EP>, pp. 1-29 (Year: 2017).*

Liang et al. CN107734617A Description Translation, Feb. 23, 2018, [database online], [retrieved on May 18, 2022] Retrieved from Espacenet using Internet <URL:https://worldwide.espacenet.com/publicationDetails/description?CC=CN&NR=107734617A&KC=A&FT=D&ND=3&date=20180223&DB=&locale=en_EP>, pp. 1-20 (Year: 2018).*

* cited by examiner

MANAGING PERFORMANCE OPTIMIZATION OF APPLICATIONS IN AN INFORMATION HANDLING SYSTEM (IHS)

FIELD

The present disclosure relates generally to Information Handling Systems (IHSs), and more particularly, to systems and methods for managing performance optimization of applications in an Information Handling System (IHS).

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs can execute many different types of applications. In some IHSs, an optimization engine may be used to improve application performance by dynamically adjusting IHS settings. Particularly, an optimization engine may apply a profile to its IHS to thereby adjust the operation of certain components of the IHS's Basic Input/Output System (BIOS), drivers, and/or Operating System (OS) layer, thus maximizing performance of a given application.

In a traditional optimization engine, profiles are: (i) manually selected by the end-user of the IHS; or (ii) automatically selected depending upon IHS resource utilization. The optimization engine detects when the end-user begins using a particular application and then adjusts the IHS's system settings as prescribed by that application's profile.

As the inventors hereof have recognized, however, in most IHS deployments different applications may need to be optimized at different times, and having the end-user manually select a desired application for optimization can produce an undesirable customer experience. Moreover, IHS resource utilization levels associated with an application can vary over time, and often an end-user would benefit from a performance boost with respect to applications that have low resource utilization.

SUMMARY

Embodiments of systems and methods for managing performance optimization of applications in an Information Handling System (IHS) are described. In an illustrative, non-limiting embodiment, a method may include identifying, by an IHS, a first application; assigning a first score to the first application based upon: (i) a user's presence state, (ii) a foreground or background application state, (iii) a power adaptor state, and (iv) a hardware utilization state, detected during execution of the first application; identifying, by the IHS, a second application; assigning a second score to the second application based upon: (i) another user's presence state, (ii) another foreground or background application state, (iii) another power adaptor state, and (iv) another hardware utilization state, detected during execution of the second application; and prioritizing performance optimization of the first application over the second application in response to the first score being greater than the second score.

In some cases, the user's presence state, and the other user presence state, may each be selected from the group consisting of: present and absent. Additionally, or alternatively, the user's presence state, and the other user presence state, may each be selected from the group consisting of: near-field, mid-field, and far-field. The foreground or background application state, and the other foreground or background application state, may each be detected by an energy estimation engine. The power adaptor state, and the other power adaptor state, may each be selected from the group consisting of: AC and DC, AC-only, and DC-only. The hardware utilization state, and the other hardware utilization state, may each be selected from the group consisting of: low, medium, and high.

In some implementations, assigning the first score may include: multiplying a selected weight by an amount of time spent, during execution of the first application, in each detected: (i) user's presence state, (ii) foreground or background application state, (iii) power adaptor state, and (iv) hardware utilization state; and adding the weighted amounts of time. Moreover, prioritizing the performance optimization of the first application may include modifying a collection frequency of data usable to optimize the performance of the first application based upon a combination of at least: (i) the user's presence state, and (ii) the foreground or background application state.

The method may also include: applying a first set of data collection parameters usable by an application optimization engine in response to the user being present and the first application being in the foreground; applying a second set of data collection parameters usable by the application optimization engine in response to the user being present and the first application being in the background; applying a third set of data collection parameters usable by the application optimization engine in response to the user being absent and the first application being in the foreground; or applying a fourth set of data collection parameters usable by the application optimization engine in response to the user being absent and the first application being in the background.

In another illustrative, non-limiting embodiment, an IHS may include a processor and a memory coupled to the processor, the memory having program instructions stored thereon that, upon execution by the processor, cause the IHS to: assign a first score to a first application based upon: (i) a user's presence state, and (ii) a foreground or background application state, detected during execution of the first application; assign a second score to a second application based upon: (i) another user's presence state, and (ii) another foreground or background application state, detected during execution of the second application; and select a collection frequency of data usable to optimize a performance of the first and second applications based upon the first and second scores, respectively.

In yet another illustrative, non-limiting embodiment, a memory storage device may have program instructions stored thereon that, upon execution by one or more processors of an IHS, cause the IHS to: detect, during execution of a first application: (i) a user's presence state, and (ii) a foreground or background application state; and select a collection frequency of data usable to optimize performance of the first application based upon the detection.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
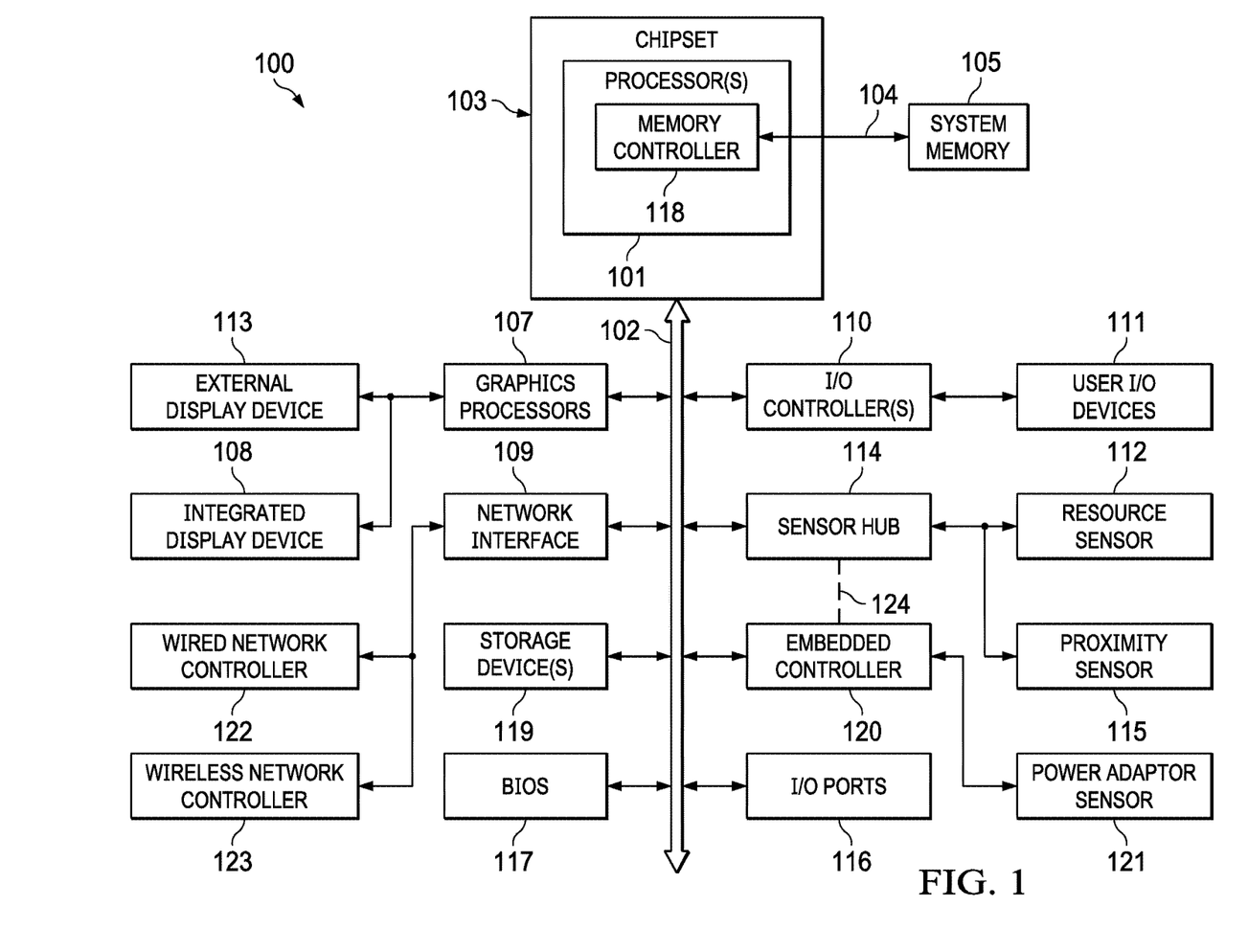
FIG. 1 is a block diagram an example of an Information Handling System (IHS) configured to manage performance optimization of applications, according to some embodiments.

FIG. 1 is a block diagram illustrating components of IHS 100 configured to manage performance optimization of applications. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to the processor(s) 101 of the IHS 100 through the chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and 113, coupled to IHS 100.

One or more display devices 108 and 113 coupled to IHS 100 may utilize LCD, LED, OLED, or other display technologies. Each display device 108 and 113 may be capable of receiving touch inputs such as via a touch controller that may be an embedded component of the display device 108 and 113 or graphics processor 107, or it may be a separate component of IHS 100 accessed via bus 102. In some cases, power to graphics processor 107, integrated display device 108 and/or external display 133 may be turned off, or configured to operate at minimal power levels, in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of sensors. For instance, sensor hub 114 may utilize hardware resource sensor(s) 112, which may include electrical current or voltage sensors, and that are capable of determining the power consumption of various components of IHS 100 (e.g., CPU 101, GPU 107, system memory 105, etc.). In certain embodiments, sensor hub 114 may also include capabilities for determining a location and movement of IHS 100 based on triangulation of network signal information and/or based on information accessible via the OS or a location subsystem, such as a GPS module.

In some embodiments, sensor hub 114 may support proximity sensor(s) 115, including optical, infrared, and/or sonar sensors, which may be configured to provide an indication of a user's presence near IHS 100, absence from IHS 100, and/or distance from IHS 100 (e.g., near-field, mid-field, or far-field).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions.

EC 120 may also implement operations for interfacing with power adaptor sensor 121 in managing power for IHS 100. These operations may be utilized to determine the power status of IHS 100, such as whether IHS 100 is operating from battery power or is plugged into an AC power source (e.g., whether the IHS is operating in AC-only mode, DC-only mode, or AC+DC mode). In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
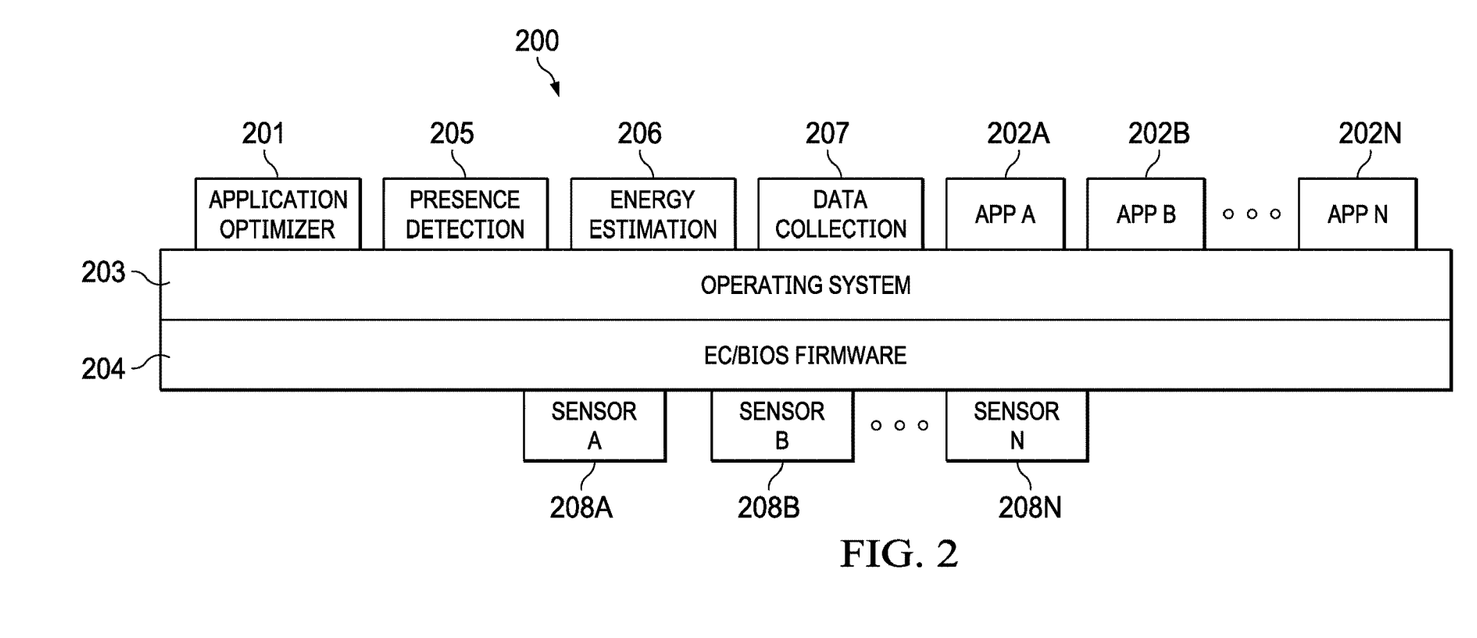
FIG. 2 is a block diagram illustrating an example of a software system produced by an IHS for managing performance optimization of applications, according to some embodiments.

FIG. 2 is a block diagram illustrating an example of software system 200 produced by IHS 100 for managing the performance optimization of applications. In some embodiments, each element of software system 200 may be provided by IHS 100 through the execution of program instructions by one or more logic components (e.g., CPU 100, BIOS 117, EC 120, etc.) stored in memory (e.g., system memory 105), storage device(s) 119, and/or firmware 117, 120.

As shown, software system 200 includes application optimizer engine 201 configured to manage the performance optimization of applications 202A-N. An example of application optimizer engine 201 is the DELL PRECISION OPTIMIZER. Meanwhile, examples of applications 202A-N include, but are not limited to, computing resource-intensive applications such as ADOBE ILLUSTRATOR, ADOBE AFTER EFFECTS, ADOBE MEDIA ENCODER, ADOBE PHOTOSHOP, ADOBE PREMIER, AUTODESK AUTOCAD, AVID MEDIA COMPOSER, ANSYS FLUENT, ANSYS WORKBENCH, SONAR CAKEWALK, and the like; as well as less resource-intensive applications, such as media players, web browsers, document processors, email clients, etc.

Both application optimizer engine 201 and applications 202A-N are executed by OS 203, which is turn supported by EC/BIOS instructions/firmware 204. EC/BIOS firmware 204 is in communications with, and configured to receive data collected by, sensor modules or drivers 208A-N—which may abstract and/or interface with hardware resource sensor 112, proximity sensor 115, and power adaptor sensor 121, for example.

In various embodiments, software system 200 also includes presence detection module or application programming interface (API) 205, energy estimation engine or API 206, and data collection module or API 207 executed above OS 203.

Presence detection module 205 may process user presence data received by one or more of sensor modules 208A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field (user's position<threshold distance A), mid-field (threshold distance A<user's position<threshold distance B, where B>A), or far-field (user's position>threshold distance C, where C>B).

Energy estimation engine 206 may include, for example, the MICROSOFT E3 engine, which is configured to provide energy usage data broken down by applications, services, tasks, and/or hardware in an IHS. In some cases, energy estimation engine 206 may use software and/or hardware sensors configured to determine, for example, whether any of applications 202A-N are being executed in the foreground or in the background (e.g., minimized, hidden, etc.) of the IHS's graphical user interface (GUI).

Data collection engine 207 may include any data collection service or process, such as, for example, the DELL DATA VAULT configured as a part of the DELL SUPPORT CENTER that collects information on system health, performance, and environment. In some cases, data collection engine 207 may receive and maintain a database or table that includes information related to IHS hardware utilization (e.g., by application, by thread, by hardware resource, etc.), power source (e.g., AC-plus-DC, AC-only, or DC-only), etc.

In operation, application optimizer engine 201 may use machine learning to improve the performance of applications 202A-N related to input/output (I/O), such as read operations and write operations. The I/O in a computing device may have multiple layers, collectively referred to as an I/O stack. The computing device may use virtual memory to enable multiple applications to share a physical storage device (e.g., a disk drive). Portions (e.g., pages) of virtual memory may be stored in main memory (e.g., random access memory (RAM)) and swapped back and forth with the physical storage device. The physical storage device may use a high-speed memory, known as a cache, to increase throughput when apps access the physical storage device. For example, when an application performs a write, the application may write to virtual memory in RAM, which is then sent to the physical storage device and stored in the cache, before being written to the physical storage device.

In addition, OS 203 may provide a file system to enable applications to perform I/O. The file system may use blocks having a particular size such that a large file is stored as multiple blocks. Multiple blocks may be located at different locations in the physical storage device and the file system may keep track of the locations of each of the multiple blocks such that the apps are unaware that the large file is being stored as multiple blocks in multiple (e.g., non-contiguous) locations.

In some cases, application optimizer engine 201 may perform an analysis of how an application accesses the I/O stack and, based on the analysis, characterize the application as having a particular type of workload. Application optimizer engine 201 may select a profile that is designed to improve I/O (e.g., increased throughput, faster execution, lower latency, and the like) for the particular type of workload. Each particular type of workload has particular characteristics (e.g., read/write (R/W) ratio, queue depth, block size, and the like) with regard to how the application accesses the I/O stack. Application optimizer engine 201 may monitor what the application is doing to the I/O stack and it may identify a particular profile with settings that improve I/O performance when accessing the I/O stack (e.g., the settings improve performance as compared to the default configuration used by the operating system and the application when initially installed).

Application optimizer engine 201 may create a classifier using a machine learning algorithm such as, for example, Random Forest, Neural Network, or the like. Combinations of different hardware platforms and different storage configurations are used to execute different types of workloads using different types of profiles and data associated with the workload characteristics is gathered. The data is used to train the classifier to identify which profile (among multiple profiles that were tested) provides the highest performance (e.g., fastest execution time) for a particular workload executing on a particular hardware platform having a particular storage configuration.

The workload characteristics (e.g., parameters) that are analyzed may include up to 1,000 different I/O related variables across layers of the storage stack including the physical disk, cache, logical disk, memory, and pagefile. For example, the characteristics may include: (1) logical and physical I/O operation counters such as, for example, I/O Read Operations/sec, I/O Write Operation, I/O Read Operations/sec, I/O Write Operations/sec, I/O Data Operations/sec, (2) process parameters, such as, for example, Virtual Bytes, Cache Copy Read Hits %, Cache Copy Reads/Sec, Page File Bytes/sec, (3) caching and OS information, such as, for example, Cache Copy Read Hits %, Cache Copy Reads/Sec, and Page File Bytes, and the like. The classifier identifies which profile from among multiple tested profiled provides the most efficient usage of I/O resources to achieve faster throughput, faster execution time, and the like reduces the impact on the user.

After training, the classifier may identify a subset (e.g., top N, where O<N<100) of the up to 1,000 I/O related parameters of collected data. The subset of parameters may be those parameters that have the highest influence on increasing throughput, e.g., the parameters that, when varied, cause the largest change (e.g., improvement) and provide the most "bang for the buck." The subset of parameters is later used when the classifier is deployed to classify a workload. One of the reasons for determining the subset of parameters is because monitoring up to 1,000 parameters on a user's computing device would significantly slow down execution of apps. In contrast, monitoring the subset of I/O parameters for a predetermined period of time (e.g., 30, 60, 90, 120 minutes, or the like) when a particular application is being used reduces the impact on the user.

In various embodiments, the subset of parameters may include, for example, Cache\Async Copy Reads/sec, Cache\Copy Read Hits %, Cache\Copy Reads/sec, Cache\Data Map Hits %, Cache\Data Maps/sec, Cache\Dirty Page Threshold, Cache\Dirty Pages, Cache\MDL Read Hits %, Cache\MDL Reads/sec, Cache\Pin Read Hits %, Cache\Pin Reads/sec, Cache\Read Aheads/sec, LogicalDisk(Total)\% Disk Read Time, LogicalDisk(Total)\% Disk Time, LogicalDisk(Total)\% Disk Write Time, LogicalDisk(Total)\Avg. Disk Bytes/Write, LogicalDisk(Total)\Avg. Disk, Queue Length, LogicalDisk(Total)\Avg. Disk Read Queue Length, LogicalDisk(Total)\Avg. Disk sec/Transfer, LogicalDisk(Total)\Avg. Disk Write Queue Length, LogicalDisk(Total)\Current Disk Queue Length, LogicalDisk(Total)\Disk Bytes/sec, LogicalDisk(Total)\Disk Read Bytes/sec, LogicalDisk(Total)\Disk Transfers/sec, LogicalDisk(Total)\Disk Write Bytes/sec, Memory\% Committed Bytes In Use, Memory\Available Bytes, Memory\Available KBytes, Memory\Available MBytes, Memory\Cache Bytes, Memory\Cache Faults/sec, Memory\Committed Bytes, Memory\Free & Zero Page List Bytes, Memory\Free System Page Table Entries, Memory\Modified Page List Bytes, Memory\Page Faults/sec, Memory\Page Reads/sec, Memory\Page Writes/sec, Memory\Pages Input/sec, Memory\Pages Output/sec, Memory\Pages/sec, Memory\Pool Nonpaged Allocs, Memory\Pool Nonpaged Bytes, Memory\Pool Paged Allocs, Memory\Pool Paged Bytes, Memory\Pool Paged Resident Bytes, Memory\Standby Cache Core Bytes, Memory\ Standby Cache Normal Priority Bytes, Memory\Standby Cache Reserve Bytes, Memory\ System Cache Resident Bytes, Memory\ System Driver Resident Bytes, Memory\ System Driver Total Bytes, PhysicalDisk(Total)\% Disk Read Time, PhysicalDisk(Total)\% Disk Time, PhysicalDisk(Total)\% Disk Write Time, PhysicalDisk(Total)\Avg. Disk Bytes/Read, PhysicalDisk(Total)\Avg. Disk Bytes/Write, PhysicalDisk(Total)\Avg. Disk Read Queue Length, PhysicalDisk(Total)\Avg. Disk sec/Transfer, PhysicalDisk(Total)\Avg. Disk Write Queue Length, PhysicalDisk(Total)\Current Disk Queue Length, Process(beast)\% Privileged Time, Process(beast)\Elapsed Time, Process(beast)\% Processor Time, Process(beast)\IO Data Bytes/sec, Process(beast)\IO Data Operations/sec, Process(beast)\IO Other Bytes/sec, Process(beast)\IO Other Operations/sec, Process(beast)\IO Read Bytes/sec, Process(beast)\IO Read Operations/sec, Process(beast)\IO Write Bytes/sec, Process(beast)\IO Write Operations/sec, Process(beasO\Page File Bytes, Process(beasO\Page File Bytes Peak, Process(beasO\Page Faults/sec, Process(beasO\Priority Base, Process(beast)\Thread Count, Process(beasO\Pool Nonpaged Bytes, Process(beasO\Pool Paged Bytes, Process(beasO\Private Bytes, Process(beast)Wirtual Bytes, Process(beast)Wirtual Bytes Peak, Process(beast)\Working Set, Process(beast)\Working Set—Private, Process(beast)\Working Set Peak, Processor(Total)\DPC Rate, Processor(Total)\DPCs Queued/sec, Processor(Total)\Interrupts/sec, System\Context Switches/sec, System\File Read Bytes/sec, System\File Read Operations/sec, System\File Write Bytes/sec, System\File Write Operations/sec, System\Processor Queue Length, and System\System Up Time.

A trained classifier may analyze the data and identify a predefined workload type from among workloads types that is closest (e.g., most similar) to the type of a workload (e.g., determined based on the collected data) that the selected application(s) present to the I/O stack. To illustrate, M may be between 10 and 30, such as about 25 different types of predefined workloads. For example, the classifier may analyze the data associated with the application and determine that the I/O requests to the I/O stack present a workload type that is similar (e.g., closest) to the predetermined workload type and select a corresponding profile.

Application optimization engine 205 may apply the settings in the profile to IHS 101 to improve the performance of an application, e.g., as related to accessing the I/O stack. For example, the profile may modify various parameters associated with the I/O stack, an OS of IHS 100, the application, another set of parameters, or any combination thereof. Applying the profile causes an increase in the speed at which the I/O requests are executed, thereby reducing execution time and increasing throughput for the application.

The profile may modify the size of caches, queues, counters, and other data structures in the I/O stack to improve the execution time of the I/O requests of the application. For example, the profile may modify parameters of a file system, such as the type of file system (e.g., FAT, exFAT, NTFS, or the like), cluster size, volume size, whether compression is used and if so, what type of compression is used, encryption, and the like. The profile may modify parameters of the memory, such as how much of the memory is allocated for paging, and other memory-related settings. The profile may modify parameters associated with the logical storage, such as how the logical storage is implemented. The profile may modify parameters associated with the cache, such as a size of the cache, under what conditions the contents of the cache are written to the physical storage, and the like. The profile may modify parameters associated with the pagefile, such as a size of the pagefile, under what conditions paging occurs, and the like. The profile may modify parameters associated with the physical storage.

The profile may modify various parameters of the application, such as the location of a temporary file, the size of various internal caches and queues, and the like. For example, a video editor application may enable a location of a temporary file to be specified. If the temporary file is located on the same storage device as the application, then I/O requests to access portions of the application software and I/O requests to access the temporary file are placed in the same queue as they access the same storage device.

In a system with two storage devices, the profile may modify the parameters to locate the temporary file (e.g., video file(s), photo file(s), audio file(s), illustration file(s), and the like) on a second storage device while the application executes on a first storage device. By locating the temporary file on the second storage device, I/O requests to access portions of the application software are placed in a first queue associated with the first storage device and I/O requests to access the temporary file are placed in a second queue associated with the second storage device. In this way, the application I/O requests and the temporary file I/O requests can be performed substantially in parallel.

Additionally, or alternatively, profiles may modify one or more parameters of OS 203 to improve performance of an application. These parameters may include: process priorities, a power plan, Vsync, hyperthreading, core parking, superfetch, cache VMEM, memory compression, page combining, etc.

Particularly, process priorities may include a priority level, e.g., high, normal, or low, associated with each process (e.g., an instance of a software application). A power plan may be one of multiple plans, such as, for example, a high-performance plan, a balanced plan, and a power save plan. By varying various power features of IHS 100, a power plan may be selected from a larger set of power plans.

Vsync refers to Vertical Synchronization (Vsync), a display option to synchronize the frame rate output by an application (e.g., via a graphics card) with the monitor refresh rate. Because a graphic processor executes as fast as possible, extremely high frame rates may be output, e.g., faster than the display device is capable of displaying. Enabling VSync caps (i.e., throttles) the monitor's refresh rate and may avoid excessive strain on the graphics processor. Because VSync makes frames wait for when the monitor is ready, enabling Vsync can cause a slight delay in displaying input, such as keypresses, mouse input, and the like.

Hyperthreading provides simultaneous multithreading to improve parallelization of computations (doing multiple tasks at once) performed by multiple cores of a CPU. With core parking, cores of CPU 101 that do not have threads scheduled for execution are parked (e.g., placed in a low power state to conserve power). A parked core may take time to be unparked to enable the core to execute a thread, thereby causing a delay. Thus, turning core parking may increase performance because an application does not wait for parked core to become available to execute a thread associated with the application.

SuperFetch is a pre-fetch feature of a memory manager of the operating system that is used to cache (e.g., in RAM) frequently-accessed data instead of on a storage device because data can be retrieved from the cache faster than from the storage device. Cache virtual memory (vMem) is memory that is allocated for virtualization (e.g., such as that provided by VMWARE or similar). For example, virtual memory addresses associated with each virtual machine is translated to physical memory addresses.

Memory compression is a memory management technique that utilizes data compression to reduce the size or number of paging requests to and from the storage. Page combining is a technique to free up memory (RAM) in which OS 203 analyzes the content of memory, locates duplicate content, and keeps a single copy of particular content while removing duplicate content from the memory. It should be understood that these are merely examples of parameters that may be modified and other parameters may be changed depending on the type of OS 203, the OS's version, and so on.

In operation, application optimizer engine 201 monitors applications 202A-N executing on IHS 100. Particularly, application optimizer engine 201 may gather data associated with the subset of I/O parameters for a predetermined period of time (e.g., 15, 30, 45, 60 minutes or the like). For each of applications 202A-N, the classifier may use the gathered data to characterize the workload, select a profile that corresponds to the workload, and apply the profile by configuring various related parameters (of IHS 100. For example, the classifier may have identified a particular set of workloads (e.g., between 10 and 50 different types of workloads) that encompass the majority of the workloads presented by different applications.

Accordingly, application optimizer engine 201 may characterize, at runtime, an application workload and improve the performance, in terms of storage I/O (e.g., the storage stack, from the file system to the physical device). Machine learning may be used to gather data associated with an application's workload (e.g., the way in which the application performs I/O), select a similar predetermined workload to the application's workload from a set of predefined workloads, select a corresponding profile to the similar predetermined workload, and configure parameters associated with the I/O (e.g., operating system parameters, device driver parameters, application parameters, device parameters, and the like) to improve the application's I/O performance.

In many cases, performance improvements may result in the same task executing faster after a profile is applied as compared to before the profile is applied, executing more tasks in a particular period of time, etc. Application optimizer engine 201 improves (i.e., "optimizes") application performance by analyzing data across layers of the storage stack including the physical disk, cache, logical disk, memory and pagefile to allow the application to make the best use of the relevant computing resources (e.g., storage-related resources).

Figure 3:
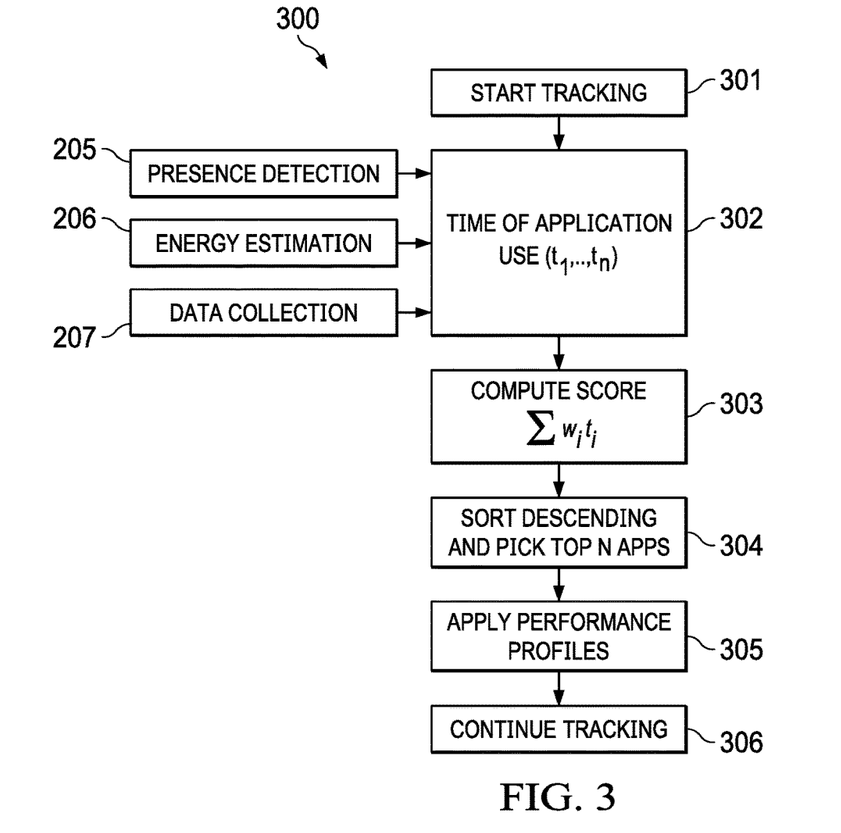
FIG. 3 is a flowchart illustrating an example of a method for managing performance optimization of applications, according to some embodiments.

FIG. 3 is a flowchart illustrating an example of method 300 for managing performance optimization of applications. In some embodiments, method 300 may be executed, at least in part, by operation of application optimization engine 201. As noted above, application optimizer engine 201 may monitor applications 202A-N executing on IHS 100, gather data for a predetermined period of time, and use the gathered data to characterize the workload. In various implementations, method 300 may be used to adaptively manage the various characterizations, learning, and/or optimization processes performed by application optimizer engine 201 by ranking applications 202A-N by order of priority—which takes into account information received by presence detection module 205, energy estimation engine 206, and data collection module 207.

At block 301, method 300 starts tracking applications 202A-N under execution by IHS 100. At block 302, method 300 keeps a record of the execution times of each of applications 202A-N, and creates a table with sensor information collected via presence detection module 205 (user is present and in the IHS's near-field, mid-field, or far-filed; or absent), energy estimation engine 206 (whether the application is in the foreground or background), and data collection module 207 (AC power only, DC power only, or AC/DC power; hardware resource utilization is low, medium, or high; etc.), for example, over a period of 2 to 3 weeks—although these time periods may vary depending upon the user or context.

At block 303, method 300 may compute a score for each application being monitored that is a weighed combination of the metrics (user presence, foreground/background, AC/DC, and utilization) multiplied by the execution time spent by that application in that state: S=w1t1+w2t2+w3t3+w4t4. At block 304, method 400 sorts the applications in descending order, for example, and selects the highest ranked (or top) N applications for optimization.

For sake of illustration, Table I below shows a hypothetical scenario where applications 202A-N are mapped by optimization engine 201 executing method 300:

TABLE I

| Application | Presence | Foreground/Background | AC/DC | Utilization | Score |
|---|---|---|---|---|---|
| 201B | Present | Foreground | AC + DC | Medium | 320 |
| 202A | Absent | Foreground | AC | High | 288 |
| ... | ... | ... | ... | ... | ... |
| 202N | Present | Background | AC + DC | Low | 230 |

In this case, if the number of applications that can be optimized is two (2), then applications 202B and 202A would be optimized (highest score) in lieu of application 202N (lowest score). In other implementations, however, a threshold score may be selected above which any number of applications with a minimum score greater than that threshold score is optimized. At block 306, method 300 applies profiles corresponding to the top application/workloads, and then method 300 continues tracking the same (or other) metrics at block 307.

Accordingly, method 300 may be used to enable dynamic learning of top applications used by end-users based on context. As a result, method 300 applies a performance boost to applications automatically and without the user's explicit selection.

In various implementations, application optimization engine 201 may implement a supervised machine learning algorithm that recommends a profile that provides best performance for predefined workloads. The learning is conducted when the end-user is running the specific application to be learned and optimized. A traditional application optimization engine would typically check active application usage based solely upon application open/close and utilization metrics (CPU, memory, and disk utilization). However, these metrics are indirect and result in longer wait times to complete the learning process and to provide performance recommendations.

For example, in some scenarios a user may not be actively using an application even though the application is open or periods of lower utilization may be an actual part of the application usage that needs to be learned. These types of scenarios can lead to longer learn times and poor customer experience. In addition, relying upon utilization metrics alone can lead to gaps in characterizing application usage and hence sub-optimal recommendations.

Figure 4:
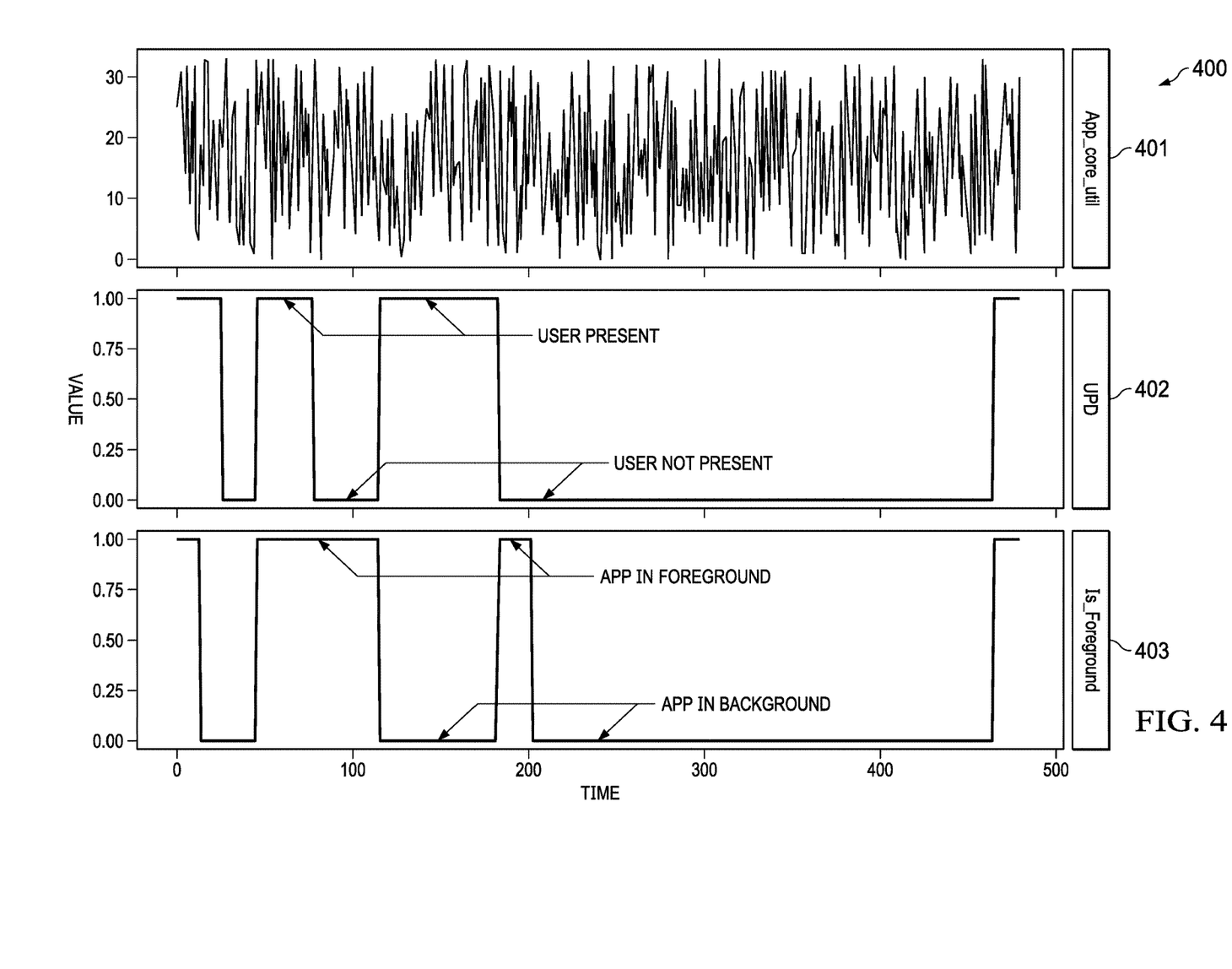
FIG. 4 are charts illustrating examples of characterization data usable to reduce learning and/or recommendation time, according to some embodiments.

To address these, and other issues, FIG. 4 shows charts 400 illustrating examples of other characterization data usable to reduce learning and/or recommendation time, according to some embodiments. Particularly, chart 401 shows core utilization over time, chart 402 shows user presence information during the same period of time (e.g., present or absent), and chart 403 shows the application's foreground/background states during the same period of time. In some cases, at least one of: user presence information, or an application's foreground/background states, may be used to determine which data collection parameters to be applied (e.g., which subset of data to be collected and/or with sampling or collection rate to use for each such data) in addition to, or as alternative to, hardware utilization data.

Figure 5:
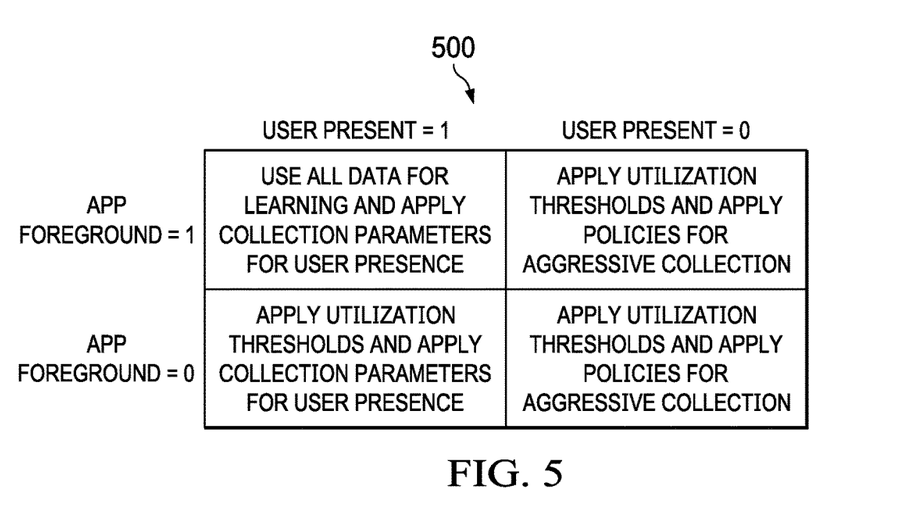
FIG. 5 is an example of a decision matrix usable to implement a method for reducing learning and/or recommendation time, according to some embodiments.

FIG. 5 shows an example of decision matrix 500 usable to implement a method for reducing learning and/or recommendation time. In this example, matrix 500 is a 2×2 matrix, although other dimensions may be used. For instance, to provide a higher level of granularity of data collection settings, a determination of user presence that involves near-field, mid-field, and far-field states (when the user is present) may be used.

As shown, however, matrix 500 includes: (a) a first set of data collection parameters usable by an application optimization engine in response to the user being present (presence=1) and the application being in the foreground (foreground=1); (b) a second set of data collection parameters usable in response to the user being present (presence=1) and the application being in the background (foreground=0); (c) a third set of data collection parameters usable in response to the user being absent (presence=0) and the application being in the foreground (foreground=1); and (d) a fourth set of data collection parameters usable in response to the user being absent (presence=0) and the application being in the background (foreground=0).

In case (a), all data collected may be used for learning and/or profile recommendation. Ordinarily, in case (b), a low utilization would ordinarily stop the data collection process; however, using matrix 500, the exact same scenario instead applies data collection parameters for user presence despite a utilization level being below a selected threshold. In cases (c) and (d), different utilization thresholds may be applied, as well as aggressive data collection parameters (e.g., higher sampling rates, additional sensors, etc.). More generally, however, each of scenarios (a)-(d) may include any suitable selected utilization thresholds and/or data collection parameters.

Figure 6:
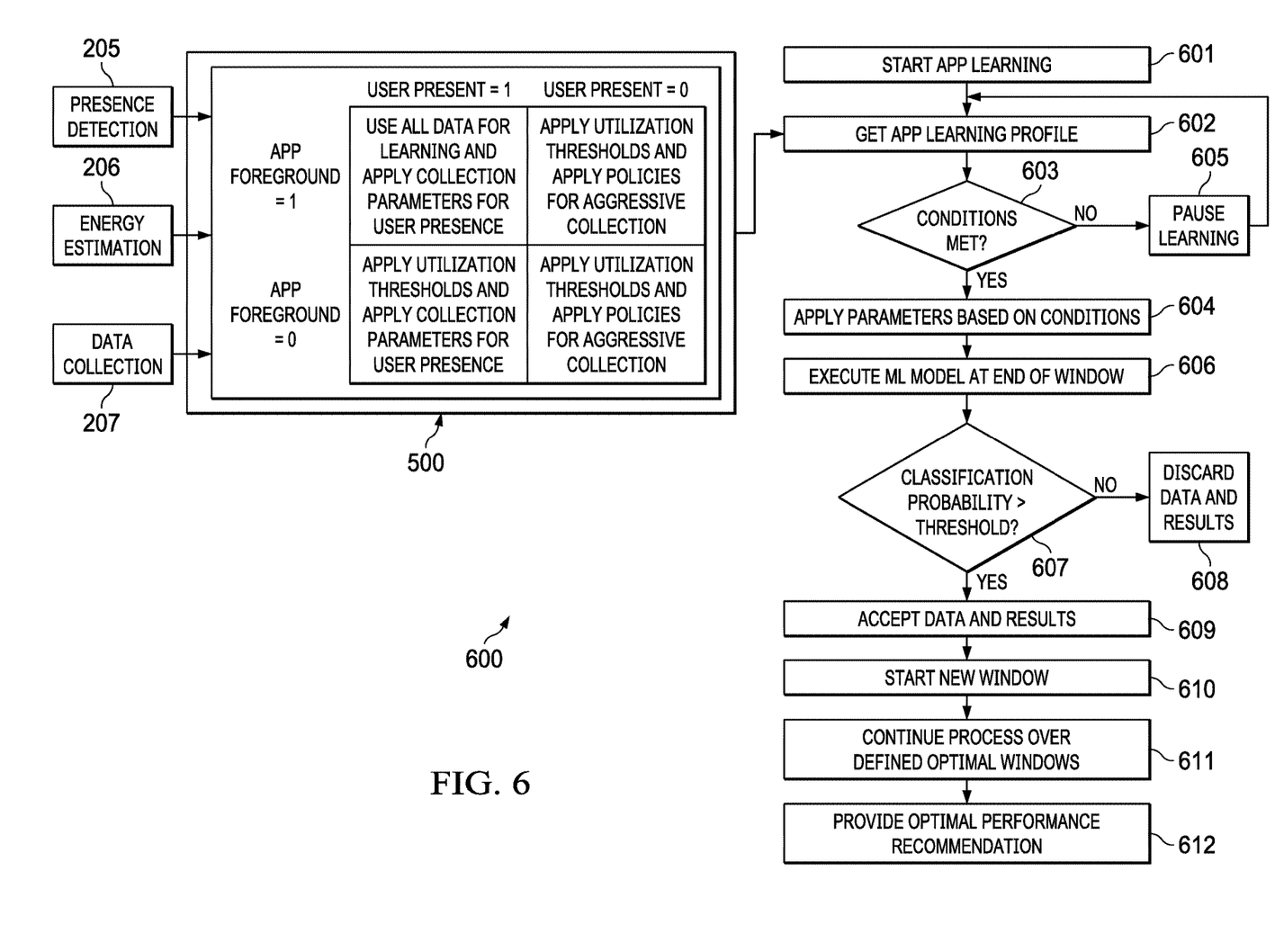
FIG. 6 is a flowchart illustrating an example of a method for reducing learning and/or recommendation time, according to some embodiments.

FIG. 6 is a flowchart illustrating an example of a method for reducing learning and/or recommendation time. In some embodiments, method 600 may be executed, at least in part, by application optimization engine 201. At block 601, optimization engine 201 may initiate an application learning process. At block 602, optimization engine 201 may obtain a learning profile, for example, from matrix 500 using data from presence detection engine 205, energy estimation engine 206, and/or data collection module 207.

At block 603, method 600 determines, for each of scenarios (a)-(d) within matrix 500 (or an N×M matrix, depending upon a selected level of user-presence granularity, for example), which scenario has all of its user presence/application foreground/background states conditions met. If there is no scenario within matrix 500 with all of its conditions met, learning pauses at block 605 and control returns to block 602. Conversely, if at least one of the scenarios in matrix 500 has all of its conditions met, block 604 applies corresponding data collection parameters despite a particular the utilization that scenario being under a selected threshold.

At block 606, method 600 applies a machine learning model at the end of a given time window. At block 607, if a classification probability is smaller than a threshold, block 608 discards the collected data and results. On the on other hand, if the classification probability is greater than the threshold, block 609 accepts the collected data and learning results. At block 610, method 600 starts a new learning time window. At block 611, method 600 continues the process over defined optimal windows. Finally, at block 612, method 600 performs optimization recommendations for the particular application.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   identifying, by an Information Handling System (IHS), a first application;
   collecting first data associated with a first subset of data collection parameters from among a plurality of available data collection parameters, the first subset of data collection parameters selected at least in part, according to a user's presence state detected during execution of the first application, wherein the user's presence state comprises present and absent;
   assigning a first score to the first application based at least in part upon the user's presence state that is obtained using at least one sensor;
   identifying, by the IHS, a second application;
   collecting second data associated with a second subset of data collection parameters from among the plurality of available data collection parameters, the second subset of data collection parameters selected at least in part, according to another user's presence state detected during execution of the second application, wherein the other user's presence state comprises one of present or absent, and wherein the first subset of data collection parameters are different than the second subset of data collection parameters;
   assigning a second score to the second application based at least in part upon the other user's presence state that is obtained using the at least one sensor; and
   prioritizing performance optimization of the first application over the second application in response to the first score being greater than the second score by modifying a collection frequency of data used to optimize performance of the first application based upon a combination of the user's presence state and a foreground or background application state detected during execution of the first application, wherein the first subset of data collection parameters includes the modified collection frequency.

2. The method of claim 1, wherein the user's presence state and the other user's presence state each comprise at least one of near-field, mid-field, and far-field.

3. The method of claim 1, wherein the first subset of data collection parameters are selected at least in part, according to the foreground or background application state detected during execution of the first application, and the second subset of data collection parameters selected at least in part, according to another foreground or background application state detected during execution of the second application.

4. The method of claim 1, further comprising assigning the first score to the first application based at least in part, upon a power adaptor state detected during execution of the first application, and assigning the second score to the second application based at least in part, upon another power adaptor state detected during execution of the second application, the power adapter state and the other power adaptor state each comprising at least one of AC and DC, AC-only, and DC-only.

5. The method of claim 1, wherein assigning the first score to the first application is based at least in part, upon a hardware utilization state detected during execution of the first application, wherein assigning the second score to the second application is based at least in part, upon another hardware utilization state detected during execution of the second application, and wherein the hardware utilization state and the other hardware utilization state each comprise at least one of low, medium, and high.

6. The method of claim 1, wherein assigning the first score to the first application is based at least in part, upon an amount of time spent by the first application in the user's presence state and wherein assigning the second score to the second application is based at least in part, upon an amount of time spent by the second application in the other user's presence state.

7. The method of claim 1, wherein the first subset of data collection parameters is at least one of: a third subset of data collection parameters used by an application optimization engine in response to the user being present and the first application being in the foreground; a fourth subset of data collection parameters used by the application optimization engine in response to the user being present and the first application being in the background; a fifth subset of data collection parameters used by the application optimization engine in response to the user being absent and the first application being in the foreground; or a sixth subset of data collection parameters used by the application optimization engine in response to the user being absent and the first application being in the background.

8. An Information Handling System (IHS), comprising:
a processor; and
a memory coupled to the processor, the memory having program instructions stored thereon that, upon execution by the processor, cause the IHS to:
collect first data associated with a first subset of data collection parameters from among a plurality of available data collection parameters, the first subset of data collection parameters selected at least in part, according to a user's presence state detected during execution of a first application, wherein the user's presence state comprises present and absent;
assign a first score to the first application based at least in part upon the user's presence state that is obtained using at least one sensor;
collect second data associated with a second subset of data collection parameters from among the plurality of available data collection parameters, the second subset of data collection parameters selected at least in part, according to another user's presence state detected during execution of a second application, wherein the other user's presence state comprises one of present or absent, and wherein the first subset of data collection parameters are different than the second subset of data collection parameters;
assign a second score to the second application based at least in part upon the other user's presence state that is obtained using the at least one sensor; and
prioritize performance optimization of the first application over the second application in response to the first score being greater than the second score by modifying a collection frequency of data used to optimize performance of the first application based upon a combination of the user's presence state and a foreground or background application state detected during execution of the first application, wherein the first subset of data collection parameters includes the modified collection frequency.

9. The IHS of claim 8, wherein the user's presence state and the other user's presence state each comprise at least one of near-field, mid-field, and far-field.

10. The IHS of claim 8, wherein the first subset of data collection parameters are selected at least in part, according to the foreground or background application state detected during execution of the first application, and the second subset of data collection parameters selected at least in part, according to another foreground or background application state detected during execution of the second application.

11. The IHS of claim 8, wherein the
first subset of data collection parameters comprises at least one of: a third subset of data collection parameters used by an application optimization engine in response to the user being present and the first application being in the foreground; a fourth subset of data collection parameters used by the application optimization engine in response to the user being present and the first application being in the background; a fifth subset of data collection parameters used by the application optimization engine in response to the user being absent and the first application being in the foreground; or a sixth subset of data collection parameters used by the application optimization engine in response to the user being absent and the first application being in the background.

12. The IHS of claim 8, wherein the program instructions, upon execution by the processor, further cause the IHS to:
assign the first score to the first application based at least in part, upon a hardware utilization state detected during execution of the first application; and
assign the second score to the second application based at least in part, upon: another hardware utilization state detected during execution of the second application.

13. The IHS of claim 8, wherein the program instructions, upon execution by the processor, further cause the IHS to assign the first score to the first application based at least in part, upon a hardware utilization state detected during execution of the first application, and assign the second score to the second application based at least in part, upon another hardware utilization state detected during execution of the second application, wherein the hardware utilization state and the other hardware utilization state each comprise at least one of low, medium, and high.

14. A memory storage device having program instructions stored thereon that, upon execution by one or more processors of an Information Handling System (IHS), cause the IHS to:
identify, by an Information Handling System (IHS), a first application;
collect first data associated with a first subset of data collection parameters from among a plurality of available data collection parameters, the first subset of data collection parameters selected at least in part, to a user's presence state, detected during execution of the first application, wherein the user's presence state comprises present and absent;
assign a first score to the first application based at least in part upon the user's presence state that is obtained using at least one sensor;
identify, by the IHS, a second application;
collect second data associated with a second subset of data collection parameters from among the plurality of available data collection parameters, the second subset of data collection parameters selected at least in part, according to another user's presence state detected during execution of the second application, wherein the other user's presence state comprises one of present or absent, and wherein the first subset of data collection parameters are different than the second subset of data collection parameters;
assign a second score to the second application based at least in part upon the other user's presence state that is obtained using the at least one sensor; and
prioritize performance optimization of the first application over the second application in response to the first score being greater than the second score by modifying a collection frequency of data used to optimize performance of the first application based upon a combination of the user's presence state and a foreground or background application state detected during execution of the first application, wherein the first subset of data collection parameters includes the modified collection frequency.

15. The memory storage device of claim 14, wherein the program instructions, upon execution, further cause the IHS to:
- assign the first score to the first application based at least in part, upon the user's presence state, and the foreground or background application state detected during execution of the first application;
- assign the second score to a second application based at least in part, upon another user's presence state, and another foreground or background application state detected during execution of the second application.

16. The memory storage device of claim 15, wherein the program instructions, upon execution, further cause the IHS to:
- assign the first score to the first application further based at least in part, upon a power adaptor state, and a hardware utilization state, detected during execution of the first application; and
- assign the second score to the second application based at least in part, upon another power adaptor state, and another hardware utilization state, detected during execution of the second application.

* * * * *